US006542324B1

(12) United States Patent
Galbiati et al.

(10) Patent No.: US 6,542,324 B1
(45) Date of Patent: Apr. 1, 2003

(54) DIGITAL CONTROL OF THE SPEED OF A MOTOR BY A POWER STAGE DRIVEN IN DISCONTINUOUS MODE

(75) Inventors: Ezio Galbiati, Agnadello (IT); Matteo Moioli, Vimercate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/531,620

(22) Filed: Mar. 21, 2000

(51) Int. Cl.$^7$ ................................................ G11B 21/02
(52) U.S. Cl. ........................................ 360/75; 318/293
(58) Field of Search ............................... 318/599, 293, 318/459, 500; 388/907.2; 360/75, 78.04, 78.06

(56) References Cited

U.S. PATENT DOCUMENTS

| | | | | |
|---|---|---|---|---|
| 5,615,064 A | * | 3/1997 | Blank et al. .................. | 360/75 |
| 6,081,112 A | * | 6/2000 | Carobolante et al. ........ | 324/177 |
| 6,204,629 B1 | * | 3/2001 | Rote et al. .................. | 318/803 |
| 6,363,214 B1 | * | 3/2002 | Merello et al. .......... | 388/928.1 |

* cited by examiner

Primary Examiner—Regina N. Holder
Assistant Examiner—Dan I Davidson
(74) Attorney, Agent, or Firm—Allen, Dyer, Doppelt, Milbrath & Gilchrist, P.A.; Lisa K. Jorgenson

(57) ABSTRACT

A driving circuit for a voice coil motor (VCM) includes a full bridge output stage for driving the motor in a pulse width modulated (PWM) mode. A multiplexer having two inputs is coupled to respective output nodes of the full bridge output stage, with one of the output nodes providing a back electromotive force induced in the motor upon setting in a high impedance state the full bridge output stage and conducting at least one transistor connected to ground in the full bridge output stage after current through the motor has decayed to zero. A controller compares a voltage representing a desired speed of the motor with the back electromotive force, and generates a correction signal based upon the comparison. A pre-driver drives the full bridge output stage as a function of the correction signal for setting in the high impedance state, and connects one of the output nodes of the full bridge output stage to ground when a certain delay time has elapsed, and produces signals that coordinately connects the input of the multiplexer coupled to the output node of the full bridge output stage not connected to ground.

43 Claims, 7 Drawing Sheets

DIGITAL CONTROL OF THE SPEED OF A MOTOR BY A POWER STAGE DRIVEN IN DISCONTINUOUS MODE

FIELD OF THE INVENTION

The present invention relates to circuits for controlling electromagnetic actuators, and, more particularly, to a method and circuit for controlling a voice coil motor for positioning the read/write head of a hard disk drive.

BACKGROUND OF THE INVENTION

Voice coil motors (VCM) are used in several applications, and, in particular in hard disk drive systems (HDD) to load or unload a read/write head onto the disk. When the disk is stopped, it is necessary to drive the mechanical arm supporting the read/write head to a safe position away from the disk. This is done to reduce the possibility of damaging the disk from vibrations when not in use. Such an operation is called ramp unloading. The inverse operation (ramp loading) must be carried out when the HDD is turned on to read data stored in the disk.

The ramp unloading operation, depicted in FIG. 1, includes parking the read/write head on a ramp situated adjacent the disk. This operation prevents the head from hitting the disk surface, thus damaging it. This operation also makes available a larger disk space for writing operations because data cannot be written in the parked area of the head.

The ramp loading requires a circuit for driving the arm that carries the read/write head. This circuit controls the speed when the read/write head is loaded from the ramp to the disk surface, and for parking or unloading the head while avoiding accidental contact with the disk surface. The regulation of the speed of the arm supporting the head is carried out in several different ways. One approach is to measure the speed of the arm using external elements, such as optical encoders assembled inside the hard disk, as disclosed in U.S. Pat. No. 5,455,723.

The speed of the arm can be measured also by measuring the back electromotive force BEMF induced in the motor by the motion of the arm. In fact, the back electromotive force BEMF produced in the motor by the motion of the arm is proportional to the speed of the arm according to the following equation:

$$BEMF = K_e \cdot \omega = \frac{K_e}{armlength} \cdot speed$$

The variable $K_e$ is a constant. Thus, the speed of the arm can be measured by measuring the BEMF of the motor. A way of deriving the value of the back electromotive force BEMF generated by the motion of the arm includes resolving the following equation $$Vmot = BEMF + R \cdot i + L \cdot \frac{di}{dt}$$

The variable Vmot is the voltage drop on the winding of the motor, R and L are the resistance and the inductance, respectively, of the winding of the motor, and i is the current flowing through the motor.

An alternative way of measuring the BEMF includes measuring the voltage drop Vmot on the winding of the motor when the current in the winding is zero. It is very important to derive a signal representing the speed of the arm allowing estimation of the speed in order to have an accurate regulation.

The known methods of regulating the speed of the arm using the BEMF do so by detecting with an amplifier the voltage drop Vmot on the two control nodes of the motor. This technique is affected by an error due to the offset of the amplifier and to the limited common mode rejection. Thus, the precision of the regulation cannot be very accurate.

A method of controlling a motor and a relative circuit not being affected by all the above mentioned errors would significantly improve the precision of the speed regulation of the arm.

SUMMARY OF THE INVENTION

It is an object of the present invention to provide a method of controlling the speed of a motor by detecting in a single-end, i.e., at a single node, the back electromotive force BEMF, comparing it with a reference value and producing a correction signal. The detection of the BEMF in a single-end eliminates errors due to the offset voltage and to the limited common mode rejection affecting a differential detection of the BEMF More specifically, the method controls a voice coil motor (VCM) driven in a pulse width modulated (PWM) discontinuous mode through a full bridge output stage by setting in a high impedance state the output stage, and detecting a back electromotive force on the motor referenced to ground potential by connecting to a ground node an output node of the stage after the current flowing in the motor has decayed to zero. The control further includes biasing in a conduction state a transistor of the stage, and generating a PWM driving signal as a function of the detected back electromotive force and of a signal representative of a desired speed of the motor.

A further object of the invention is to provide a driving circuit for a voice coil motor (VCM) driven in a PWM mode through a full bridge stage. The driving circuit comprises a multiplexer having two inputs coupled to respective output nodes of the stage, an output node on which a back electromotive force induced in the motor is made available upon setting in a high impedance state the stage, and turning on a transistor of the conduction stage referenced to ground potential after the current through the motor has decayed to zero.

A controller compares a certain voltage representing the desired speed of the motor with the back electromotive force and outputs a correction signal. A pre-driver produces the driving signals of the transistor bridge as a function of the correction signal in order to set in the high impedance state the full bridge stage, and, when a certain delay time has elapsed, to connect a control node of the motor to a ground potential. Signals controlling the multiplexer coordinately turn on the switch coupled to the node of the full bridge stage not connected to the ground potential.

BRIEF DESCRIPTION OF THE DRAWINGS

Further advantages of the invention will be more evident by a detailed description of the invention and by referring to the attached drawings wherein.

DETAILED DESCRIPTION OF THE PREFERRED EMBODIMENTS

The present invention can be conveniently applied to monitor the speed of the motor by detecting the back electromotive force BEMF generated by the motor because of its motion. Usually the BEMF is detected in a differential manner with an amplifier coupled to the control nodes of the motor. Such a detection is affected by an offset error because of the offset voltage of the amplifier. Consequently, the control of the motor is not very precise. The present invention allows a non-negligible improvement in thy precision of the control of the motor by detecting in a single-end the value of the back electromotive force BEMF.

The method of the invention detects in a single-end, i.e., at a single node, the BEMF of the motor while the motor is set in a high impedance state and the current flowing in it is zero. This is done by connecting to a ground potential GND a node of the motor and detecting the BEMF as the potential is referred to ground on the other node. The detected back electromotive force is compared to a voltage signal representative of the desired speed so that the appropriate signals for driving the motor can be generated.

Figure 1:
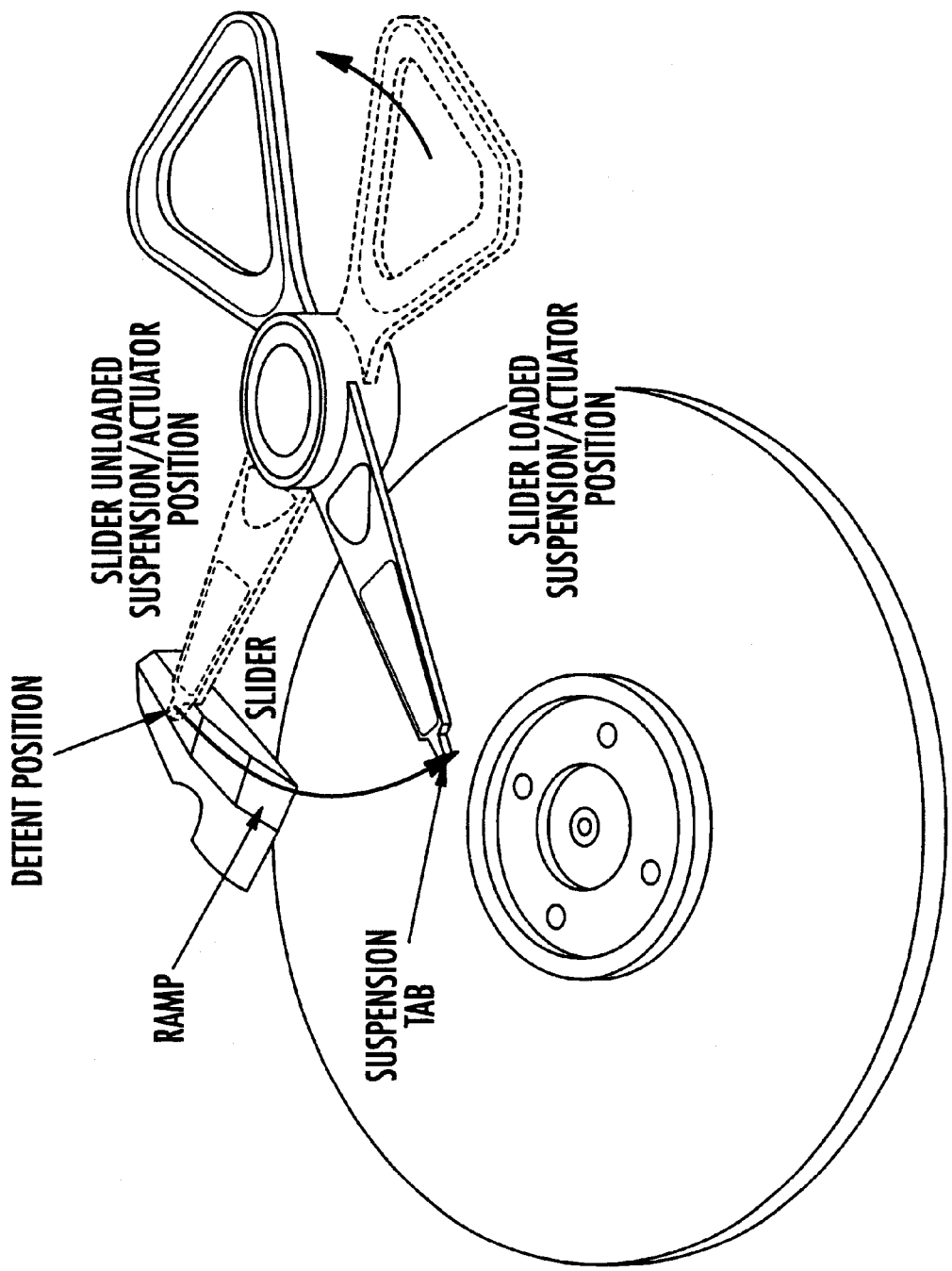
FIG. 1 depicts the ramp loading system according to the present invention.
Figure 2:
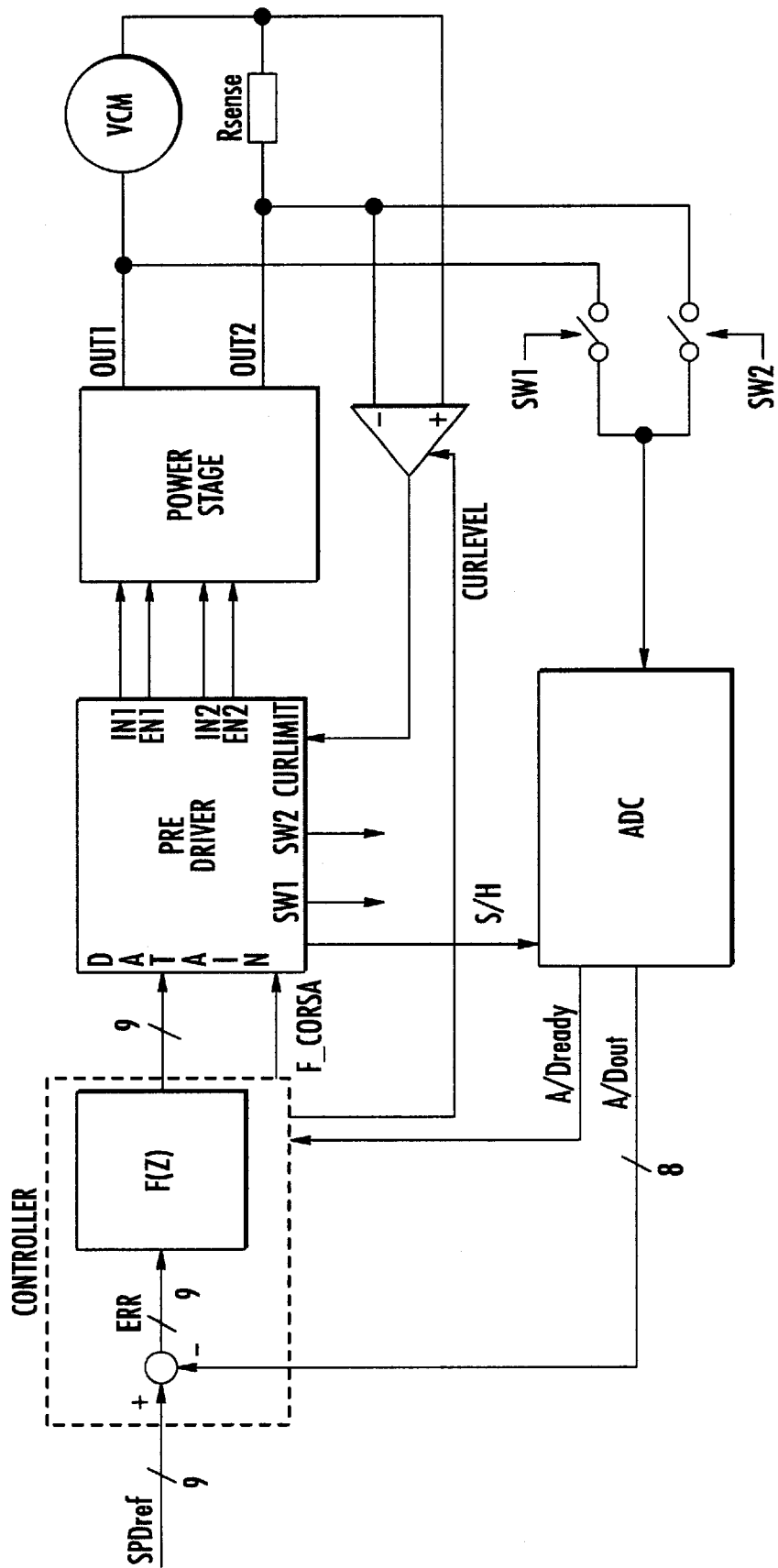
FIG. 2 is a block diagram of the digital speed controller according to the present invention.

A basic diagram of driving circuit of the motor is depicted in FIG. 2. The driving loop is constituted by a power stage comprising a circuit for detecting the current in the motor. A pre-driver receives the data output by the controller and generates the driving signals for the power stage. The controller compares the input SPDREF representing the desired direction and speed of the motor with the output of the A/D converter A/DOUT representing the effective speed.

The power stage comprises a full bridge for driving the motor. The output of each half bridge OUT1 and OUT2 are controlled by logic inputs IN1, EN1, IN2 and EN2. The inputs IN1 and IN2 set in a conduction state the upper or the lower MOS transistor of each half bridge. The inputs EN1 and EN2 enable or set in a high impedance state a respective half bridge.

Figure 3A:
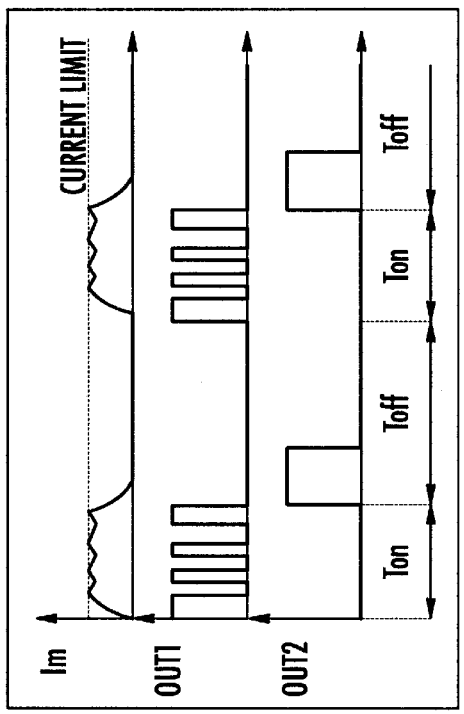
FIG. 3a depicts several current and voltage waveforms of a PWM power stage driven without current limitations according to the present invention.
Figure 3B:
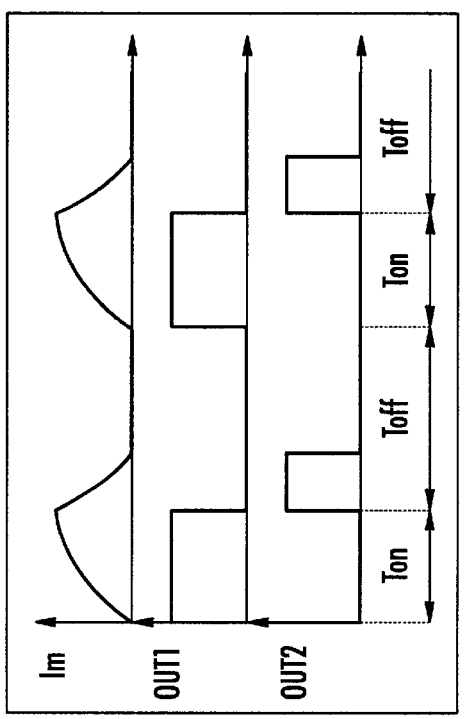
FIG. 3b depicts several current and voltage waveforms of a PWM power stage driven with current limitations according to the present invention.

Possible waveforms of the output voltages OUT1 and OUT2 and the current $I_m$ of the motor driven in a PWM discontinuous mode, without any maximum current limitations, are depicted in FIG. 3a. During the $T_{on}$ period a diagonal of the bridge is set in a conduction state, while in the $T_{off}$ period the bridge is set in a high impedance state. This determines a rapid decay to zero of the current flowing in the motor.

Figure 4:
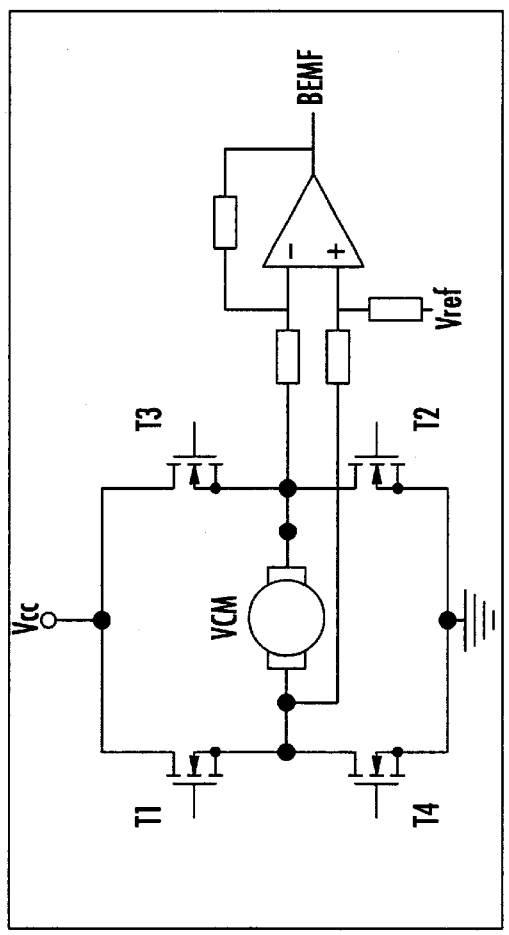
FIG. 4 is a basic diagram of a BEMF differential detector according to the prior art.

When the current is zero and the motor is in a high impedance state, it is possible to detect the BEMF generated by the motor from the nodes of the power stage OUT1 and OUT2 using a differential amplifier, as shown in FIG. 4. Such a system is affected by errors due to the offset voltage of the input stage of the amplifier and to the common mode rejection ratio of the amplifier, which produces an intolerable error in regulating the speed of the motor.

Figure 5:
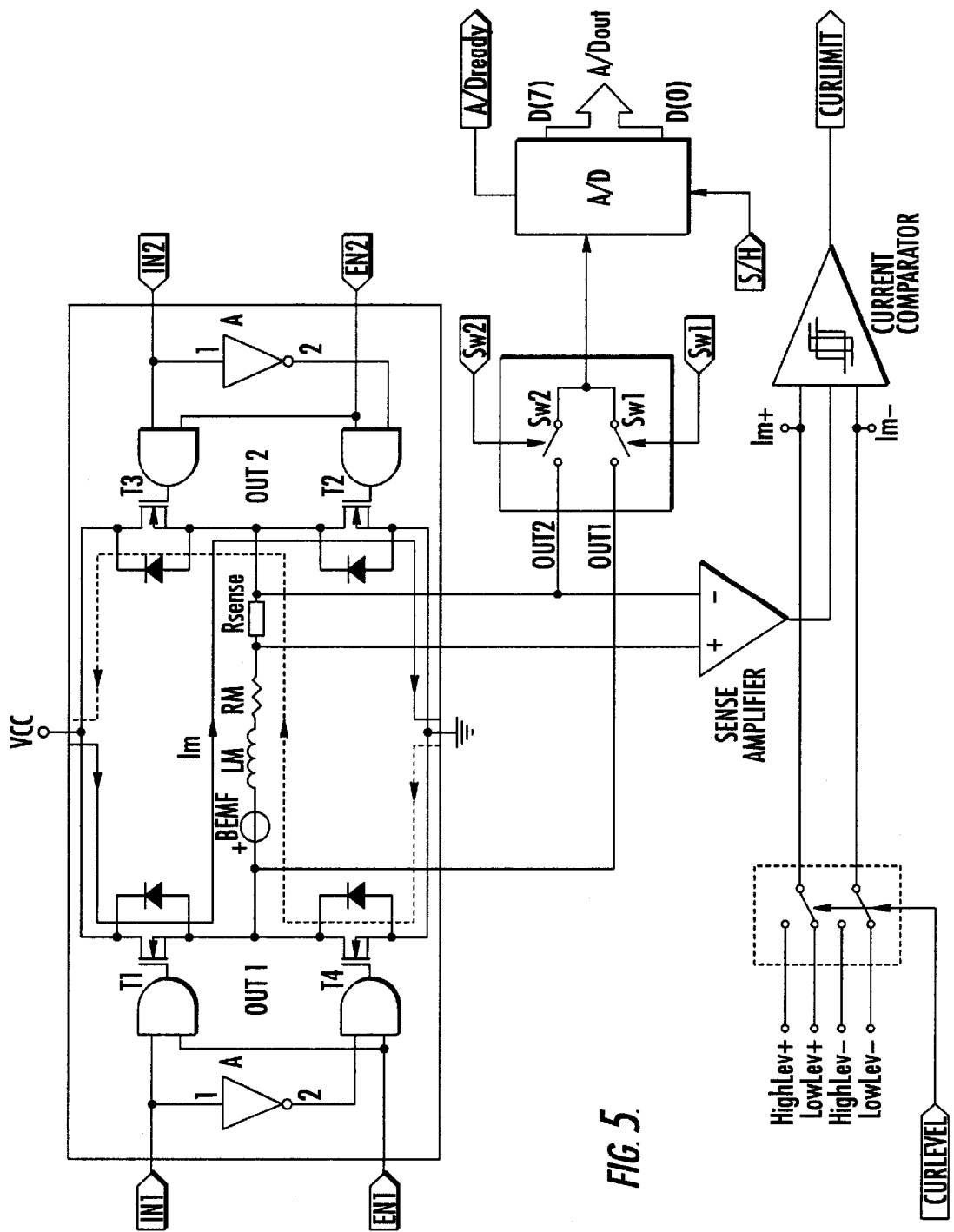
FIG. 5 describes in greater detail the power stage illustrated in FIG. 2.

The power stage of the driving circuit of the invention is depicted in FIG. 5. The transistors T2 and T4 turn on when the current in the motor is zero in order to detect the BEMF. The right polarity is always determined because the sign of the BEMF is known a priori. In fact, the BEMF tends always to slow down the motion of the arm, so the sign of the BEMF is known because the direction of the motion is known.

During the $T_{off}$ period and when the current is zero, the low side driver of the half bridge on which the negative polarity of the BEMF is present can be set in a conduction state without changing the operating condition of the motor. The value of the BEMF produced by the motor can be detected by detecting the potential referenced to the ground potential of the central node of the half bridge when in a high condition state. A circuit detecting the BEMF in the above mentioned manner is depicted in FIG. 5. The motor has been drawn as an inductor $L_M$ plus a resistor $R_M$ in series to a voltage generator.

If a ramp loading must be carried out, the polarity of the current $I_m$ is known a priori. Let us suppose, for example, that $I_m$ flows in the direction indicated by the continuous line. In the example of FIG. 5, the current flows from OUT1 to OUT2 driven by transistors T1 and T2, and the BEMF generated will have its positive polarity on the output OUT1 and its negative polarity on the output OUT2.

As explained above, during the $T_{off}$ period the current decays to zero by flowing through transistors T3 and T4 and through the supply voltage (dashed line). When the current is zero the transistor T2 is turned on and the BEMF is produced on the output OUT1. Obviously, during an unload operation the polarity of the BEMF is opposite that of a load operation, so the transistor to be turned on is T4 and the BEMF will be detected on the output OUT2.

A double switch, or equivalently a multiplexer, for changing the node in which the BEMF must be detected is depicted in FIG. 5. The double switch is controlled by two inputs Sw1 and Sw2 that are synchronized to the turn on operation of the low side driver during the $T_{off}$ period and when the current is zero. More precisely, during the load period the transistor T2 is turned on and the switch Sw1 is set in a conduction state. During the unload period the transistor T4 is turned on and the switch Sw2 is set in conduction state.

The output of the double switch is coupled to an analog/digital converter A/D that produces a digital version of the BEMF. The A/D converter samples its input when a logic signal S/H is present and outputs a correct value when the flag A/DREADY is produced. Moreover, a circuit for limiting the current of the motor includes a sense amplifier outputting a voltage proportional to the voltage drop on a sensing resistance $R_{SENSE}$ in series to the motor as depicted in FIG 5. The voltage is provided to a window comparator with thresholds $I_m+$ and $I_m-$, which can be programmed by a logic signal CURLEVEL. This produces a flag CURLIMIT indicating that the current flowing in the motor is within thresholds.

Figure 6:
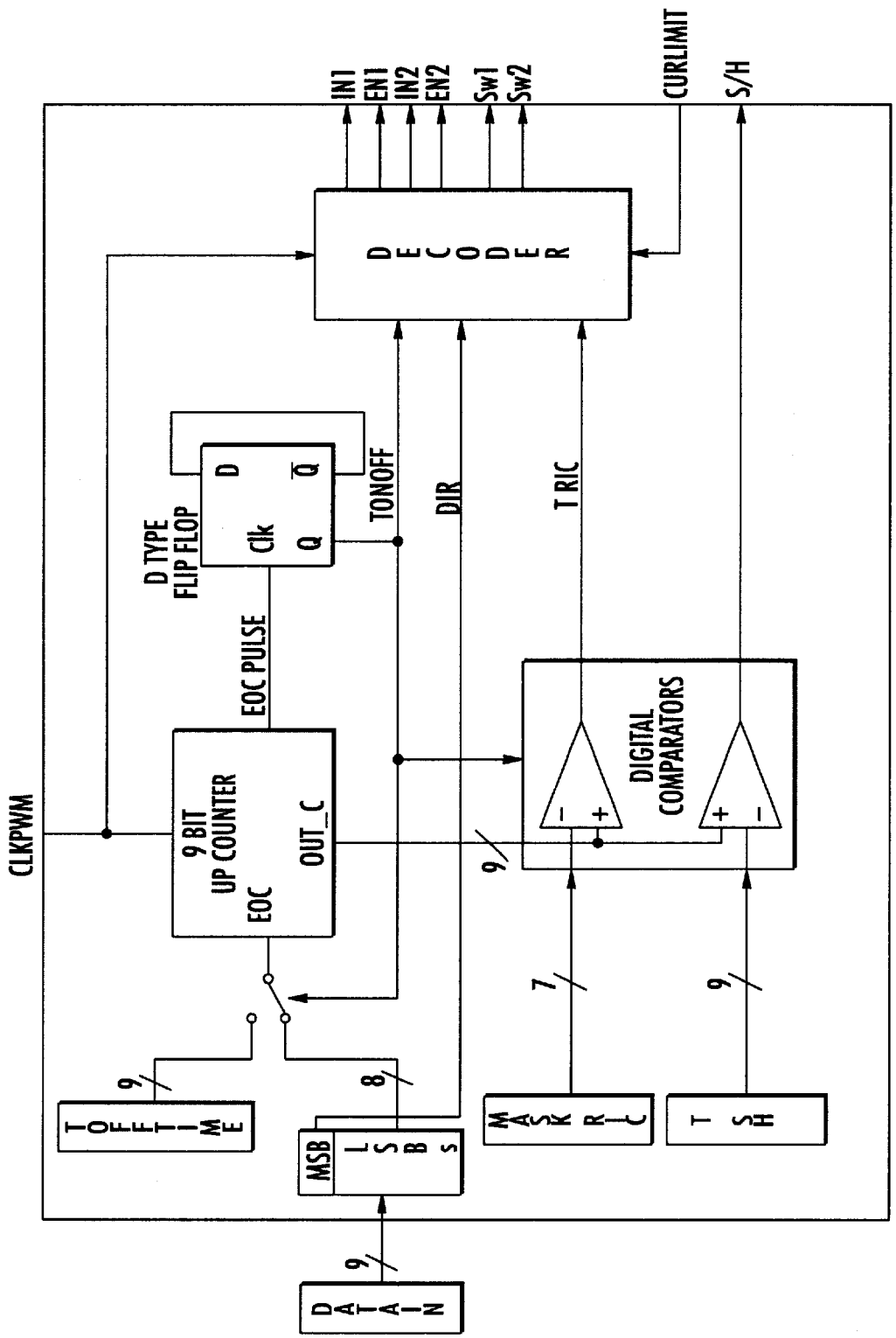
FIG. 6 is a block diagram of the pre-driver depicted in FIG. 2.

An embodiment of the pre-driver circuit of FIG. 2 is depicted in FIG. 6. From the input signal DATAIN, composed of a sign bit and a set of bits Representing the absolute value, a certain number of logic signals (EN1, IN1, EN2, IN2, Sw1, Sw2, S/H) driving the full bridge control the motor, the double switch and the A/D block of FIG. 5 are produced. The pre-driver, clocked by a clock CLKPWM, has a programmable register TOFFTIME setting the duration of the time interval $T_{off}$ the motor is set in la high impedance state.

The pre-driver circuit drives the current flowing in the motor in a PWM discontinuous mode producing the timing diagrams depicted in FIG. 3a. The timing diagrams are relative to the current flowing in the motor $I_m$ and the potentials OUT1 and OUT2 of the two nodes of the motor. Three different conditions of the motor can be identified.

A first condition is the on condition. In this condition, a supply voltage, whose polarity depends by the loading or unloading operation to be carried out, is applied for a $T_{on}$ time. Inputs EN1 and EN2 of the power stage enable the two half bridges, while inputs IN1 and IN2 enable a pair of transistors with no common node. Referring to FIG. 5, if current must flow in the motor according to the continuous line, IN1 must be high and IN2 must be low. The current $I_m$ flowing in the motor varies according to the following equation:

$$I_m(t) = \frac{V_{cc}}{R} \cdot \left(1 - e^{\frac{t}{\tau_e}}\right) \quad (1)$$

where:
$R=2*R_{DSON}+R_M+Rsense$
$R_{DSON}$=resistance of a turned-on transistor;
$R_M$=resistance of the motor;
$R_{sense}$=sensing resistance;
L=inductance of the motor;
$\Gamma_e$=L/R=time constant; and
$V_{cc}$=supply voltage.

The BEMF has not been considered in writing the above equation because the supply voltage is much larger than the BEMF normally generated during the load/unload operation.

A second condition is the free-wheeling condition. In this condition, the power stage is tristated by setting EN1 and EN2 low. The current $I_M$ flows through the free-wheeling diodes because it cannot decay instantaneously to zero. The free-wheeling voltage drop is greater than the supply voltage $$V_1 = -(V_{CC} + 2*V_D)$$

where $V_D$ is the voltage drop on a free-wheeling diode. During the free-wheeling condition; the current decreases with the following time law:

$$I_m(t) = \frac{V_1}{R} + \left(\overline{I_m} - \frac{V_1}{R}\right) \cdot e^{\frac{t}{\tau_e}}$$

The variable $\overline{I}_m$ is the current value at the end of the on condition. When the current flowing in the motor becomes zero, the free-wheeling diodes turn off and the current remains zero. In such an instant the voltage drop on the motor is equal to the BEMF.

The third condition is the off condition. In this condition, there is no current flowing in the motor for the $T_{off}$ time interval. This time interval must be sufficiently large to allow the sampling of the BEMF, its digital conversion, its comparison to a voltage value representative of the desired speed and the calculation of a correction signal.

The pre-driver is composed of an n-bit up counter UP_COUNTER receiving as an end count signal EOC either the least significant bits of the signal DATAIN or the datum provided by the register TOFFTIME. This counter increments its output OUT_C at each clock pulse of CLKPWM. When the output of the counter is equal to EOC, a positive pulse EOC_PULSE is produced and is fed to a D type flip-flop, whose output Q represents the duty cycle of the output voltage and drives the switch that selects the signal to be used as EOC. The output Q is also used, together with the signal DIR (which is the most significant bit of DATAIN), by the decoder for producing the driving signals of the output stage IN1, EN1, IN2, EN2.

Figure 7:
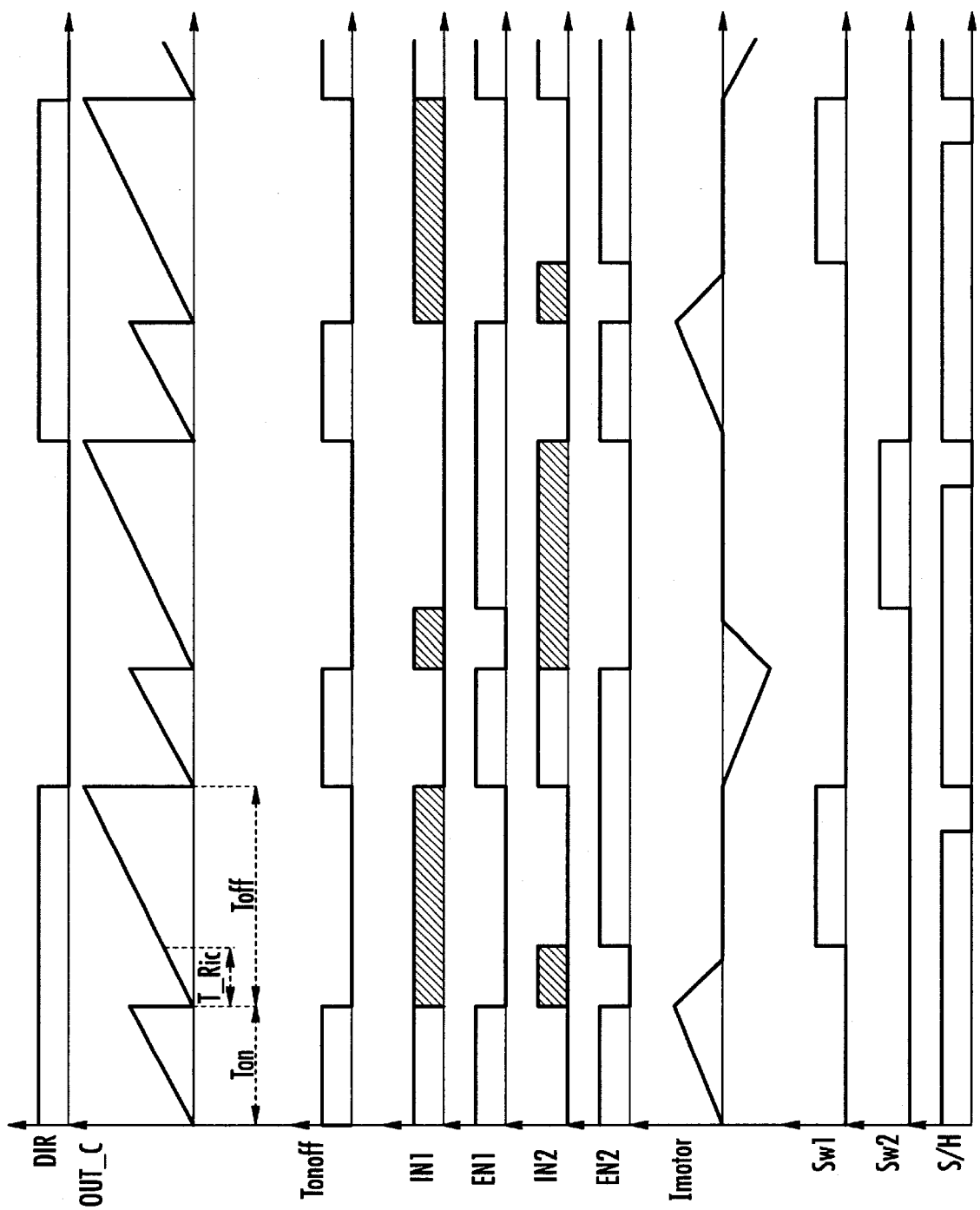
FIG. 7 is a timing diagram illustrating operation of the pre-driver illustrated in FIG. 2.

A timing diagram describing how the pre-driver operates is depicted in FIG. 7. The $T_{on}$ condition is determined by the signal DATAIN that defines the direction of the current, the duty cycle of the output voltage, and thus the mean value of the current of the motor. In the $T_{on}$ condition the signals EN1 and EN2 are switched high for enabling the bridge, while the level of signals IN1 and IN2 depends on the value of DIR. Every time the current reaches the current thresholds $I_m+$ and $I_m-$, signals IN1 and IN2 switch low, thus enabling the low side driver of the output stage. A free-wheeling condition of the current of the motor, which slowly decays, is activated. This condition is kept for a programmable time duration, then the level of signals IN1 and IN2 is restored to the previous condition until the current reaches the programmed threshold value.

As above mentioned, the sampling of the BEMF is carried out in the $T_{off}$ condition by turning on a low side driver of the power stage and by detecting the voltage in the central point of the half bridge opposite to the one on the low side driver that has been turned on when the current in the inductance of the motor has decayed to zero.

When the $T_{off}$ period begins, the enable signals EN1 and EN2 switch low thus setting in a high impedance state the output stage. After a certain time T_RIC has elapsed, the current in the motor is zero, a low side of a half bridge is turned on and a switch couples a node of the motor to the A/D converter. This time duration T_RIC is calculated by comparing the output of the UP_COUNTER during the $T_{off}$ time with the value programmed in the register MASK_RIC. When the UP_COUNTER reaches the value stored in the MASK_RIC register the computation is stopped.

The signal S/H enabling the sampling of the A/D converter is produced by comparing, during the $T_{off}$ time, the output of the UP_COUNTER to the value stored in the programmable register T_SH. The value stored in the T_SH register is slightly lower than the TOFFTIME, because the sampling must be carried out before the time $T_{off}$ has elapsed. This is done for converting in digital form the value of the BEMF and carrying out all needed calculations before a new on condition begins.

The output A/DOUT of the A/D converter is periodically calculated with the frequency of the PWM. The output represents the absolute value of the BEMF and thus the value of the speed of the motor, is fed-back to the controller along with the signal A/DREADY. At each sampling period, which is defined by the signal A/DREADY, the controller of FIG. 2 compares the input SPDREF to the A/DOUT. The controller can be formed in several different manners for example, by using a microprocessor or a DSP. The input SPDREF is data indicating the direction and the absolute value of the desired speed of the motor. The data A/DOUT represents the absolute value of the effective speed of the motor, so it is necessary to verify which one of the signals SPDREF and A/DOUT has the greatest absolute value, and to successively calculate the difference between them.

The controller calculates the correction signal to input the pre-driver using a digital filter having a transfer function F(z). A preferred embodiment of such a filter includes an IIR filter whose transfer function is:

$$F(z) = \frac{a_0 \cdot z + a_1}{b_0 \cdot z + b_1}$$

In the following, the hypothesis is that all digital values are constituted by a set of bits whose most significant bit MSB represents the sign of the considered value and the least significant bits LSB represent its absolute value.

The controller also implements a function for managing the end-run of the arm during ramp loading and unloading. The circuit depicted in FIG. 8 produces a flag F_CORSA that signals to the pre-driver that the arm is at the end of its run in the following manner. A block ONE_SHOT produces pulses resetting the D-type flip flop so the signal F_CORSA changes each time a load/unload operation is started, i.e., each time the sign of the desired speed changes as indicated by the most significant bit MSB of the SPDREF.

Figure 8:
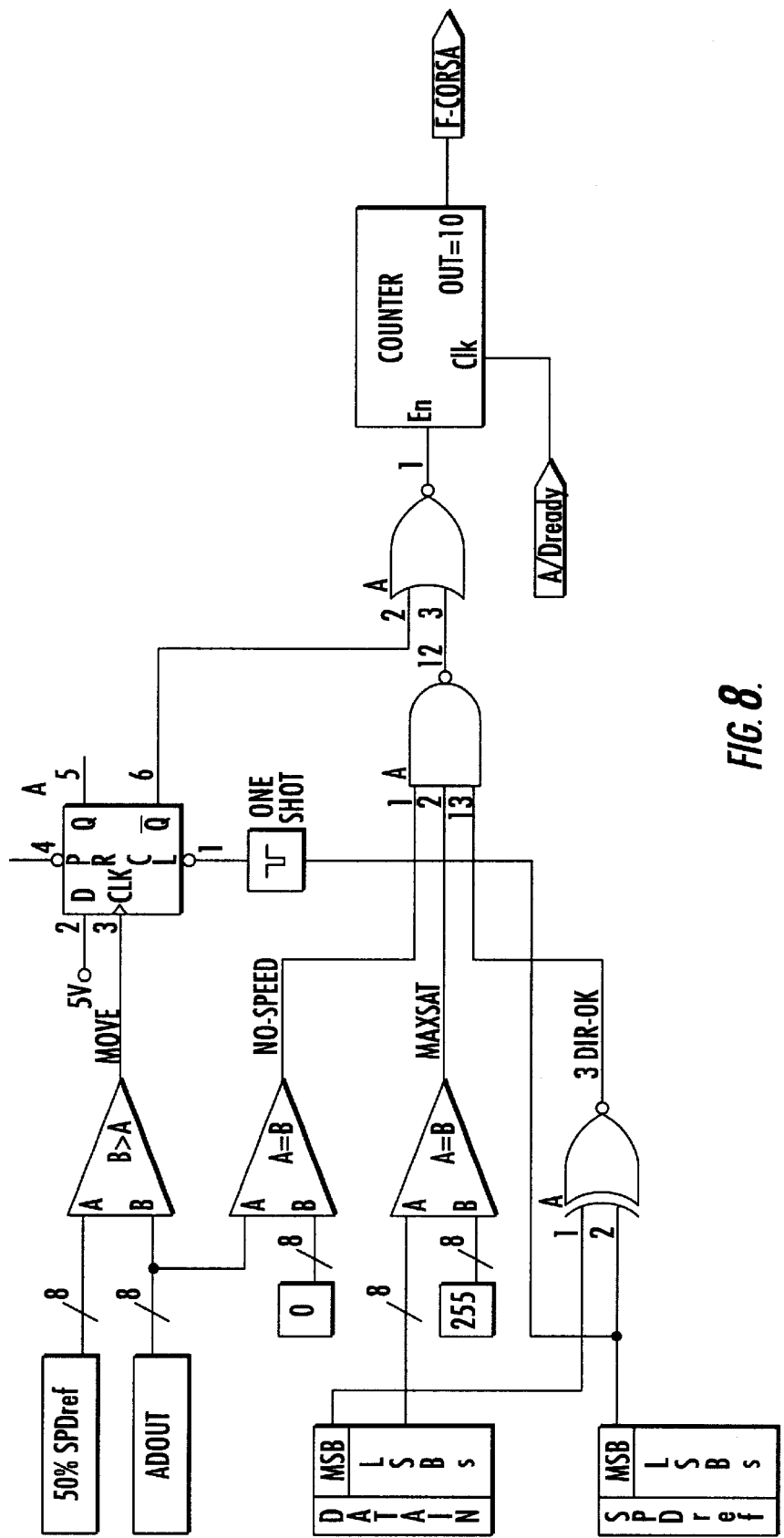
FIG. 8 is a block diagram of the end-run detection circuit of the controller illustrated in FIG. 2.

The circuit of FIG. 8 avoids an erroneous detection of the end-run of the arm by testing several values. The first test is on the speed of the motor in order to be sure that the arm is moving and the speed is being regulated. If the speed of the motor exceeds a certain value stored in a register 50%SPDREF, in the example this value is equal to 50% of the desired speed, the arm is moving so the output $\overline{Q}$ of the D flip-flop is switched high.

The second test relates to the direction of the arm. An XOR gate is input with the most significant bit MSB, which stores the sign of the desired speed SPDREF and of the correction signal DATAIN. A flag DIR-OK is output indicating whether the SPDREF and the DATAIN have the same sign. A flag NO-SPEED, indicating that the arm is stopped, is produced by a first comparator of the A/DOUT and represents a zero value. A second comparator outputs another flag MAXSAT indicating that the absolute value stored in the least significant bit LSB of DATAIN of the correction signal has reached the largest value (255).

The output DATAIN of the filter attains a maximum value corresponding to its saturation value when the speed of the arm becomes zero. For this reason the fact that DATAIN is assuming the largest possible value can be used as an indicator that the arm is in an end-run position.

When the flags DIR-OK, MAXSAT and NO-SPEED are high, the input EN enables the UP_COUNTER to start counting using the signal A/DREADY as a clock. If EN is high for a certain time count, which is equal to 10 in the example of FIG. 8, the end-run flag F-CORSA is activated and the pre-driver sets in a high impedance state the full bridge that drives the motor. This terminates the load or unload operation. If EN is not kept high for the time count, the UP_COUNTER stops counting without activating the flag F-CORSA and resets.

Sometimes the value of DATAIN can even be assigned to the maximum value to correct more rapidly the speed of the arm. Such a situation can happen when a ramp unloading is commanded immediately after the beginning of a seek operation. In fact, during a seek operation the motor is driven to the maximum speed towards the center or the periphery of the disk. If during this operation a ramp unloading is commanded, the controller must avoid the read/write head from bumping too violently against its detent or inner position.

The filter F(z) will produce the appropriate correction signal DATAIN for avoiding such a bump, but only after a certain delay time due to the fact that the frequency band of the filter is limited. For this reason DATAIN is set to the maximum permitted value, according to the desired direction of the current that must circulate in the motor. This is done until the speed of the motor is reduced to a smaller value. By doing so a faster braking of the motor is obtained.

Another advantage for having a faster reduction of the speed is to set the thresholds of the current window to their largest value by varying the signal CURLEVEL, so a larger current can flow through the motor.

That which is claimed is:

1. A method for controlling a voice coil motor (VCM) driven in a pulse width modulated (PWM) discontinuous mode through a full bridge output stage comprising at least one transistor, the method comprising:

setting the full bridge output stage to a high impedance state;

detecting a back electromotive force induced by the motor by connecting to ground an output node of the full bridge output stage after current flowing in the motor has decayed to zero by biasing into a conduction state the at least one transistor; and generating a PWM driving signal as a function of the detected back electromotive force and a signal representative of a desired speed of the motor.

2. A method according to claim 1 further comprising:

generating a signal representative of a voltage drop across a resistance in series with the motor;

comparing the representative signal with a high threshold and a low threshold, and producing a limit detection flag if the representative signal is between the high and low thresholds; and driving the full bridge output stage as a function of the limit detection flag.

3. A method according to claim 2 further comprising generating a digital value representing the back electromotive force when a sample and hold flag is generated.

4. A method according to claim 3 further comprising:

measuring a voltage difference between a voltage of the signal representative of the desired speed of the motor and the digital value representing the back electromotive force; and filtering the voltage difference for generating a correction signal.

5. A method according to claim 4 further comprising:

generating a flag indicating that the digital value representing the back electromotive force has been generated; and generating an end-run flag indicating that a mechanical arm coupled to the motor has reached a final position.

6. A method according to claim 5 wherein generating the end-run flag comprises:

comparing the digital value representing the back electromotive force with a threshold proportional to the voltage of the signal representing the desired speed of the motor, and generating a motion detection flag indicating that the mechanical arm is moving if the digital value representing the back electromotive force exceeds the threshold;

comparing the digital value representing the back electromotive force with a zero value, and generating a no-speed flag indicating that the mechanical arm is stopped if the digital value is zero;

comparing the correction signal with a saturation value, and generating a saturation flag indicating that the filter is saturated if the correction signal is equal to the saturation value;

comparing a sign of the correction signal with a sign of the voltage representing the desired speed of the motor, and generating a direction flag if the signs are equal to each other;

generating an enable signal based upon the flags and the sign of the voltage representing the desired speed of the motor which is forced to a null value each time the sign of the voltage representing the desired speed of the motor changes, the enable signal being active if at the same time the no-speed flag, the saturation flag and the direction flag are active after the motion detection flag has switched to an active value; and counting the flag indicating that the digital value representing the back electromotive force has been generated, the counting being performed as a result of the enable signal, and generating the end-run flag as an end-computation signal.

7. A method for controlling a motor comprising:

setting an output stage to a high impedance state;

detecting a back electromotive force induced by the motor by connecting to a first voltage reference an output node of the output stage after current flowing in the motor has decayed to zero; and generating a pulse width modulated (PWM) driving signal as a function of the detected back electromotive force and a signal representative of a desired speed of the motor.

8. A method according to claim 7 wherein the pulse width modulated (PWM) driving signal drives the motor in a PWM discontinuous mode.

9. A method according to claim 7 wherein the output stage is a full bridge output stage and comprises at least one transistor; and wherein the step of detecting comprises biasing into a conduction state the at least one transistor after current flowing in the motor has decayed to zero.

10. A method according to claim 7 further comprising:

generating a signal representative of a voltage drop across a resistance in series with the motor;

comparing the representative signal with a high threshold and a low threshold, and producing a limit detection flag if the representative signal is between the high and low thresholds; and driving the full bridge output stage as a function of the limit detection flag.

11. A method according to claim 10 further comprising generating a digital value representing the back electromotive force when a sample and hold flag is generated.

12. A method according to claim 11 further comprising:

measuring a voltage difference between a voltage of the signal representative of the desired speed of the motor and the digital value representing the back electromotive force; and filtering the voltage difference for generating a correction signal.

13. A method according to claim 12 further comprising:

generating a flag indicating that the digital value representing the back electromotive force has been generated; and generating an end-run flag indicating that a mechanical arm coupled to the motor has reached a final position.

14. A method according to claim 13 wherein generating the end-run flag comprises:

comparing the digital value representing the back electromotive force with a threshold proportional to the voltage of the signal representing the desired speed of the motor, and generating a motion detection flag indicating that the mechanical arm is moving if the digital value representing the back electromotive force exceeds the threshold;

comparing the digital value representing the back electromotive force with a zero value, and generating a no-speed flag indicating that the mechanical arm is stopped if the digital value is zero;

comparing the correction signal with a saturation value, and generating a saturation flag indicating that the filter is saturated if the correction signal is equal to the saturation value;

comparing a sign of the correction signal with a sign of the voltage representing the desired speed of the motor, and generating a direction flag if the signs are equal to each other;

generating an enable signal based upon the flags and the sign of the voltage representing the desired speed of the motor which is forced to a null value each time the sign of the voltage representing the desired speed of the motor changes, the enable signal being active if at the same time the no-speed flag, the saturation flag and the direction flag are active after the motion detection flag has switched to an active value; and counting the flag indicating that the digital value representing the back electromotive force has been produced, the counting being performed as a result of the enable signal, and generating the end-run flag as an end-computation signal.

15. A driving circuit for a voice coil motor (VCM) comprising:

a full bridge output stage comprising at least one transistor for driving the motor in a pulse width modulated (PWM) mode;

a multiplexer having two inputs coupled respectively to output nodes of said full bridge output stage, one of the output nodes providing a back electromotive force induced in the motor upon setting to a high impedance state said full bridge output stage;

a controller comparing a voltage representing a desired speed of the motor with the back electromotive force, and outputting a correction signal based upon the comparison; and a pre-driver for driving said full bridge output stage as a function of the correction signal for setting said full bridge output stage in the high impedance state, and for connecting one of the output nodes of said full bridge output stage to ground by biasing said at least one transistor into a conduction state after current through the motor has decayed to zero, and for producing at least one signal that coordinately connects an input of said multiplexer to the output node of said full bridge output stage not connected to ground.

16. A driving circuit according to claim 15 further comprising:

a resistance in series with the motor;

an amplifier producing a signal representative of a voltage drop across said resistance;

a comparator comparing the representative signal with a high threshold and a low threshold, and generating a limit detection flag if the representative signal is between the high and low thresholds; and said pre-driver driving said full bridge output stage as a function of the limit detection flag.

17. A driving circuit according to claim 16 further comprising an analog/digital converter that generates a digital value representing the back electromotive force, the digital value being provided to said controller when a sample and hold flag is generated by said pre-driver.

18. A driving circuit according to claim 17 wherein said controller further comprises:
- an adder generating a signal representing a voltage difference between the voltage representing the desired speed of the motor and the digital value representing the back electromotive force; and
- a filter having an input receiving the voltage difference for generating the correction signal.

19. A driving circuit according to claim 18 wherein said analog/digital converter generates a flag indicating that the digital value representing the back electromotive force has been generated; and
- said controller further comprising an end-run detector generating an end-run flag indicating that a mechanical arm coupled to the motor has reached a final position.

20. A driving circuit according to claim 19 wherein said end-run detector comprises:
- a first comparator for comparing the digital value representing the back electromotive force with a threshold proportional to the voltage representing the desired speed of the motor, and generating a motion detection flag indicating that the mechanical arm is moving if the digital value representing the back electromotive force exceeds the threshold;
- a second comparator for comparing the digital value representing the back electromotive force with a zero value, and generating a no-speed flag indicating that the mechanical arm is stopped if the digital value is zero;
- a third comparator for comparing the correction signal with a saturation value, and generating a saturation flag indicating that said filter is saturated if the correction signal is equal to the saturation value;
- a fourth comparator for comparing a sign of the correction signal with a sign of the voltage representing the desired speed of the motor, and generating a direction flag if the signs are equal to each other;
- an enabling circuit having an input receiving the flags and the sign of the voltage representing the desired speed of the motor, and generating an enable signal which is forced to a null value each time the sign of the voltage representing the desired speed of the motor changes, the enable signal being active if at the same time the no-speed flag, the saturation flag and the direction flag are active after the motion detection flag has switched to an active value; and
- a counter for counting the flag indicating that the digital value representing the back electromotive force has been generated, said counter being enabled by the enable signal, and generating the end-run flag as an end-computation signal.

21. A driving circuit according to claim 20 wherein said enabling circuit comprises:
- a circuit for outputting a reset pulse each time the sign of the voltage representing the desired speed of the motor changes;
- a D-type flip-flop being enabled with the motion detection flag and being reset with the reset pulse, and generating a logic signal;
- a NAND gate having imputs for receiving the no-speed flag, the saturation flag and the direction flag; and
- a NOR gate having inputs for receiving an output signal of said NAND gate and the logic signal, and generating the enable signal.

22. A driving circuit according to claim 21 wherein said pre-driver comprises:
- an input for receiving the correction signal;
- a first circuit for providing a logic set signal indicating when the motor must be set in a condition state or in the high impedance state;
- a second circuit for providing a delay signal indicating a time between when the motor is set in the high impedance state and the current flowing in the motor has decayed to zero;
- the sample and hold flag indicating when said analog/digital converter receives the back electromotive force; and
- a decoder having an input receiving the delay signal, the logic set signal, the sign of the voltage representing the desired speed of the motor, and the limit detection flag, and generating signals driving said full bridge output stage and said multiplexer.

23. A driving circuit for a motor comprising:
- an output stage for driving the motor;
- a multiplexer having two inputs coupled respectively to output nodes of said output stage, one of the output nodes providing a back electromotive force induced in the motor upon setting in a high impedance state said output stage;
- a controller comparing a voltage representing a desired speed of the motor with the back electromotive force, and outputting a correction signal based upon the comparison; and
- a pre-driver for driving said output stage as a function of the correction signal for setting said output stage in the high impedance state, and for connecting one of the output nodes of said output stage to a first voltage reference when a delay time has elapsed, and for producing at least one signal that coordinately connects an input of said multiplexer to the output node of said output stage not connected to the first voltage reference.

24. A driving circuit according to claim 23 wherein the motor is a voice coil motor, and said output stage is a full bridge output stage and comprises at least one transistor for driving the motor in a pulse width modulated (PWM) mode.

25. A driving circuit according to claim 24 wherein said at least one transistor comprises at least one transistor for each output node, said predriver for connecting one of the output nodes of said full bridge output stage to the first voltage reference by biasing a respective transistor into a conduction state after current through the motor has decayed to zero.

26. A driving circuit according to claim 23 further comprising:
- a resistance in series with the motor;
- an amplifier producing a signal representative of a voltage drop across said resistance;
- a comparator comparing the representative signal with a high threshold and a low threshold, and generating a limit detection flag if the representative signal is between the high and low thresholds; and
- said pre-driver driving said output stage as a function of the limit detection flag.

27. A driving circuit according to claim 26 further comprising an analog/digital converter that generates a digital value representing the back electromotive force, the digital value being provided to said controller when a sample and hold flag is generated by said pre-driver.

28. A driving circuit according to claim 27 wherein said controller further comprises:

an adder generating a signal representing a voltage difference between the voltage representing the desired speed of the motor and the digital value representing the back electromotive force; and a filter having an input receiving the voltage difference for generating a correction signal.

29. A driving circuit according to claim 28 wherein said analog/digital converter generates a flag indicating that the digital value representing the back electromotive force has been generated; and said controller further comprising an end-run detector generating an end-run flag indicating that a mechanical arm coupled to the motor has reached a final position.

30. A driving circuit according to claim 29 wherein said end-run detector comprises:

a first comparator for comparing the digital value representing the back electromotive force with a threshold proportional to the voltage representing the desired speed of the motor, and generating a motion detection flag indicating that the mechanical arm is moving if the digital value representing the back electromotive force exceeds the threshold;

a second comparator for comparing the digital value representing the back electromotive force with a zero value, and generating a no-speed flag indicating that the mechanical arm is stopped if the digital value is zero;

a third comparator for comparing the correction signal with a saturation value, and generating a saturation flag indicating that said filter is saturated if the correction signal is equal to the saturation value;

a fourth comparator for comparing a sign of the correction signal with a sign of the voltage representing the desired speed of the motor, and generating a direction flag if the signs are equal to each other;

an enabling circuit having an input receiving the flags and the sign of the voltage representing the desired speed of the motor, and generating an enable signal which is forced to a null value each time the sign of the voltage representing the desired speed of the motor changes, the enable signal being active if at the same time the no-speed flag, the saturation flag and the direction flag are active after the motion detection flag has switched to an active value; and a counter for counting the flag indicating that the digital value representing the back electromotive force has been generated, said counter being enabled by the enable signal, and generating the end-run flag as an end-computation signal.

31. A driving circuit according to claim 30 wherein said enabling circuit comprises:

a circuit for outputting a reset pulse each time the sign of the voltage representing the desired speed of the motor changes;

a D-type flip-flop being enabled with the motion detection flag and being reset with the reset pulse, and generating a logic signal;

a NAND gate having inputs for receiving the no-speed flag, the saturation flag and the direction flag; and a NOR gate having inputs for receiving an output signal of said NAND gate and the logic signal, and generating the enable signal.

32. A driving circuit according to claim 31 wherein said pre-driver comprises:

an input for receiving the correction signal;

a first circuit for providing a logic set signal indicating when the motor must be set in a conduction state or in the high impedance state; and a second circuit for providing a delay signal indicating a time between when the motor is set in the high impedance state and the current flowing in the motor has decayed to zero; and the sample and hold flag indicating when said analog/digital converter receives the back electromotive force; and a decoder having an input receiving the delay signal, the logic set signal, the sign of the voltage representing the desired speed of the motor, and the limit detection flag, and generating signals driving said output stage and said multiplexer.

33. A disk drive comprising:

at least one disk;

an actuator comprising an arm and a motor attached thereto;

a read/write head coupled to said arm; and a driving circuit for said motor for controlling movement of said arm with respect to said at least one disk, said driving circuit comprising an output stage for driving the motor, a multiplexer having two inputs coupled respectively to output nodes of said output stage, one of the output nodes providing a back electromotive force induced in the motor upon setting in a high impedance state said output stage, a controller comparing a voltage representing a desired speed of the motor with the back electromotive force, and outputting a correction signal based upon the comparison, and a pre-driver for driving said output stage as a function of the correction signal for setting in the high impedance state, and for connecting one of the output nodes of said output stage to a first voltage reference when a delay time has elapsed, and for producing at least one signal that coordinately connects an input of said multiplexer to the output node of said output stage not connected to the first voltage reference.

34. A disk drive according to claim 33 further comprising a ramp adjacent said at least one disk having an inclined surface for slidably engaging said arm.

35. A disk drive according to claim 34 wherein the motor is a voice coil motor, and said output stage is a full bridge output stage and comprises at least one transistor for driving the motor in a pulse width modulated (PWM) mode.

36. A disk drive according to claim 35 wherein said at least one transistor comprises at least one transistor for each output node, said predriver for connecting one of the output nodes of said full bridge output stage to the first voltage reference by biasing a respective transistor into a conduction state after current through the motor has decayed to zero.

37. A disk drive according to claim 33 further comprising:

a resistance in series with the motor;

an amplifier producing a signal representative of a voltage drop across said resistance;

a comparator comparing the representative signal with a high threshold and a low threshold, and generating a limit detection flag if the representative signal is between the high and low thresholds; and said pre-driver driving said output stage as a function of the limit detection flag.

38. A disk drive according to claim 37 further comprising an analog/digital converter that generates a digital value representing the back electromotive force, the digital value being provided to said controller when a sample and hold flag is generated by said pre-driver.

39. A disk drive according to claim 38 wherein said controller further comprises:

an adder generating a signal representing a voltage difference between the voltage representing the desired speed of the motor and the digital value representing the back electromotive force; and a filter having an input receiving the voltage difference for generating a correction signal.

40. A disk drive according to claim 39 wherein said analog/digital converter generates a flag indicating that the digital value representing the back electromotive force has been generated; and said controller further comprising an end-run detector generating an end-run flag indicating that a mechanical arm coupled to the motor has reached a final position.

41. A disk drive according to claim 40 wherein said end-run detector comprises:

a first comparator for comparing the digital value representing the back electromotive force with a threshold proportional to the voltage representing the desired speed of the motor, and generating a motion detection flag indicating that said arm is moving if the digital value representing the back electromotive force exceeds the threshold;

a second comparator for comparing the digital value representing the back electromotive force with a zero value, and generating a no-speed flag indicating that said arm is stopped if the digital value is zero;

a third comparator for comparing the correction signal with a saturation value, and generating a saturation flag indicating that said filter is saturated if the correction signal is equal to the saturation value;

a fourth comparator for comparing a sign of the correction signal with a sign of the voltage representing the desired speed of the motor, and generating a direction flag if the signs are equal to each other;

an enabling circuit having an input receiving the flags and the sign of the voltage representing the desired speed of the motor, and generating an enable signal which is forced to a null value each time the sign of the voltage representing the desired speed of the motor changes, the enable signal being active if at the same time the no-speed flag, the saturation flag and the direction flag are active after the motion detection flag has switched to an active value; and a counter for counting the flag indicating that the digital value representing the back electromotive force has been generated, said counter being enabled by the enable signal, and generating the end-run flag as an end-computation signal.

42. A disk dive according to claim 41 wherein said enabling circuit comprises:

a circuit for outputting a reset pulse each time the sign of the voltage representing the desired speed of the motor changes;

a D-type flip-flop being enabled with the motion detection flag and being reset with the reset pulse, and generating a logic signal;

a NAND gate having inputs for receiving the no-speed flag, the saturation flag and the direction flag; and a NOR gate having inputs for receiving an output signal of said NAND gate and the logic signal, and generating the enable signal.

43. A disk drive according to claim 42 wherein said pre-driver comprises:

an input for receiving the correction signal;

a first circuit for providing a logic set signal indicating when the motor must be set in a conduction state or in the high impedance state; and a second circuit for providing a delay signal indicating a time between when the motor is set in the high impedance state and the current flowing in the motor has decayed to zero;

the sample and hold flag indicating when said analog/digital converter receives the back electromotive force; and a decoder having an input receiving the delay signal, the logic set signal, the sign of the voltage representing the desired speed of the motor, and the limit detection flag, and generating signals driving said output stage and said multiplexer.

\* \* \* \* \*